(12) United States Patent
Fiedel et al.

(10) Patent No.: US 10,106,649 B2
(45) Date of Patent: Oct. 23, 2018

(54) ETHOXYLATE PRODUCTION USING HIGHLY ACTIVE DOUBLE METAL CYANIDE CATALYSTS

(71) Applicant: Evonik Degussa GmbH, Essen (DE)

(72) Inventors: Olga Fiedel, Essen (DE); Frank Schubert, Neukirchen-Vluyn (DE); Michael Fiedel, Essen (DE); Wilfried Knott, Essen (DE)

(73) Assignee: Evonik Degussa GmbH, Essen (DE)

( * ) Notice: Subject to any disclaimer, the term of this patent is extended or adjusted under 35 U.S.C. 154(b) by 0 days.

(21) Appl. No.: 15/312,505

(22) PCT Filed: Apr. 28, 2015

(86) PCT No.: PCT/EP2015/059124
§ 371 (c)(1),
(2) Date: Nov. 18, 2016

(87) PCT Pub. No.: WO2015/176921
PCT Pub. Date: Nov. 26, 2015

(65) Prior Publication Data
US 2017/0081469 A1   Mar. 23, 2017

(30) Foreign Application Priority Data

May 19, 2014  (DE) .................. 10 2014 209 408

(51) Int. Cl.
| | |
|---|---|
| *C07C 43/00* | (2006.01) |
| *C08G 65/26* | (2006.01) |
| *C08L 83/12* | (2006.01) |
| *C08G 77/46* | (2006.01) |

(52) U.S. Cl.
CPC .......... *C08G 65/2663* (2013.01); *C08L 83/12* (2013.01); *C08G 77/46* (2013.01)

(58) Field of Classification Search
CPC ...... C08G 65/2663; C08G 77/46; C08L 83/12
USPC ....................................................... 568/620
See application file for complete search history.

(56) References Cited

U.S. PATENT DOCUMENTS

| | | |
|---|---|---|
| 5,093,101 A | 3/1992 | Knott et al. |
| 5,198,207 A | 3/1993 | Knott et al. |
| 5,221,499 A | 6/1993 | Klein et al. |
| 5,290,912 A | 3/1994 | Watabe et al. |
| 5,371,161 A | 12/1994 | Knott |
| 5,430,166 A | 7/1995 | Klein et al. |
| 5,430,167 A | 7/1995 | Klein et al. |
| 5,455,367 A | 10/1995 | Klein et al. |
| 5,475,127 A | 12/1995 | Klein et al. |
| 5,565,183 A | 10/1996 | Knott |
| 5,670,129 A | 9/1997 | Klapdor et al. |
| 5,831,103 A | 11/1998 | Knott |
| 5,856,548 A | 1/1999 | Drose et al. |
| 5,934,579 A | 8/1999 | Hiersche et al. |
| 5,951,739 A | 9/1999 | Klapdor et al. |
| 5,972,285 A | 10/1999 | Knott |
| 5,981,812 A | 11/1999 | Eufinger et al. |
| 6,051,680 A | 4/2000 | Faraj |
| 6,197,089 B1 | 3/2001 | Frommeyer et al. |
| 6,255,511 B1 | 7/2001 | Klein et al. |
| 6,291,622 B1 | 9/2001 | Drose et al. |
| 6,307,082 B1 | 10/2001 | Klein et al. |
| 6,348,565 B1 | 2/2002 | Wehmeyer |
| 6,362,126 B1 | 3/2002 | Grosch et al. |
| 6,387,154 B1 | 5/2002 | Frommeyer et al. |
| 6,444,007 B1 | 9/2002 | Knott et al. |
| 6,489,498 B2 | 12/2002 | Klein et al. |
| 6,521,771 B2 | 2/2003 | Frommeyer et al. |
| 6,659,162 B2 | 12/2003 | Frommeyer et al. |
| 6,854,506 B2 | 2/2005 | Knott et al. |
| 6,858,663 B2 | 2/2005 | Knott et al. |
| 6,874,562 B2 | 4/2005 | Knott et al. |
| 6,915,834 B2 | 7/2005 | Knott et al. |
| 6,942,716 B2 | 9/2005 | Knott et al. |
| 7,018,458 B2 | 3/2006 | Knott et al. |
| 7,125,585 B2 | 10/2006 | Dudzik et al. |
| 7,157,541 B2 | 1/2007 | Knott et al. |
| 7,196,153 B2 | 3/2007 | Burkhart et al. |
| 7,598,334 B2 | 10/2009 | Ferenz et al. |
| 7,612,158 B2 | 11/2009 | Burkhart et al. |
| 7,612,159 B2 | 11/2009 | Burkhart et al. |
| 7,619,035 B2 | 11/2009 | Henning et al. |
| 7,645,848 B2 | 1/2010 | Knott et al. |
| 7,754,778 B2 | 7/2010 | Knott et al. |
| 7,825,205 B2 | 11/2010 | Knott et al. |
| 7,825,206 B2 | 11/2010 | Neumann et al. |

(Continued)

FOREIGN PATENT DOCUMENTS

| | | | |
|---|---|---|---|
| CN | 1454916 | 11/2003 | |
| CN | 1880359 | 12/2006 | |
| EP | 0 485 637 A1 | 5/1992 | |
| WO | 99/64152 A1 | 12/1999 | |
| WO | 01/90219 A1 | 11/2001 | |
| WO | WO 0190219 A1 * | 11/2001 | ............. B01J 27/26 |

OTHER PUBLICATIONS

International Search Report dated Jun. 30, 2015 in PCT/EP2015/059124 filed Apr. 28, 2015.
U.S. Appl. No. 12/759,787, filed Apr. 14, 2010, US 2010/0266651 A1, Oliver Springer, et al.
U.S. Appl. No. 13/031,324, filed Feb. 21, 2011, US 2011/0230619 A1, Dirk Kuppert, et al.

(Continued)

*Primary Examiner* — Clinton Brooks
*Assistant Examiner* — Kofi Adzamli
(74) *Attorney, Agent, or Firm* — Nexsen Pruet PLLC; Philip P. McCann

(57) ABSTRACT

The invention relates to polyethers preparable in the presence of a DMC catalyst comprising polyether siloxanes, to processes for preparing the polyethers and to the use thereof.

16 Claims, No Drawings

(56) References Cited

U.S. PATENT DOCUMENTS

| | | | |
|---|---|---|---|
| 7,825,209 | B2 | 11/2010 | Knott et al. |
| 8,138,294 | B2 | 3/2012 | Henning et al. |
| 8,247,525 | B2 | 8/2012 | Schubert et al. |
| 8,268,939 | B2 | 9/2012 | Ebbrecht et al. |
| 8,283,422 | B2 | 10/2012 | Schubert et al. |
| 8,309,664 | B2 * | 11/2012 | Knott ................. C08G 65/2639 525/474 |
| 8,309,673 | B2 | 11/2012 | Schubert et al. |
| 8,324,325 | B2 | 12/2012 | Knott et al. |
| 8,334,355 | B2 | 12/2012 | Henning et al. |
| 8,349,907 | B2 | 1/2013 | Henning et al. |
| 8,420,567 | B1 | 4/2013 | Naumann et al. |
| 8,420,748 | B2 | 4/2013 | Henning et al. |
| 8,450,514 | B2 | 5/2013 | Schubert et al. |
| 8,455,603 | B2 | 6/2013 | Ferenz et al. |
| 8,476,189 | B1 | 7/2013 | Naumann et al. |
| 8,557,944 | B2 | 10/2013 | Henning et al. |
| 8,598,295 | B2 | 12/2013 | Henning et al. |
| 8,609,798 | B2 | 12/2013 | Knott et al. |
| 8,623,984 | B2 | 1/2014 | Henning et al. |
| 8,722,834 | B2 | 5/2014 | Knott et al. |
| 8,722,836 | B2 | 5/2014 | Knott et al. |
| 8,729,207 | B2 | 5/2014 | Hartung et al. |
| 8,772,423 | B2 | 7/2014 | De Gans et al. |
| 8,779,079 | B2 | 7/2014 | Henning et al. |
| 8,802,744 | B2 | 8/2014 | Knott et al. |
| 8,841,400 | B2 | 9/2014 | Henning et al. |
| 8,883,932 | B2 | 11/2014 | Brugger et al. |
| 8,921,437 | B2 | 12/2014 | Knott et al. |
| 8,946,369 | B2 | 2/2015 | Henning et al. |
| 8,957,009 | B2 | 2/2015 | Schubert et al. |
| 8,969,502 | B2 | 3/2015 | Knott et al. |
| 8,974,627 | B2 | 3/2015 | Schubert et al. |
| 8,993,706 | B2 | 3/2015 | Schubert et al. |
| 9,035,011 | B2 | 5/2015 | Ferenz et al. |
| 9,051,424 | B2 | 6/2015 | Lobert et al. |
| 9,068,044 | B2 | 6/2015 | Schubert et al. |
| 9,115,335 | B2 | 8/2015 | Trosin et al. |
| 9,175,126 | B2 | 11/2015 | Albrecht et al. |
| 9,315,614 | B2 | 4/2016 | Schubert et al. |
| 9,334,354 | B2 | 5/2016 | Ferenz et al. |
| 9,346,919 | B2 | 5/2016 | Jazkewitsch et al. |
| 9,353,225 | B2 | 5/2016 | Knott et al. |
| 9,440,220 | B2 | 9/2016 | Naumann et al. |
| 2010/0105843 | A1 | 4/2010 | Knott et al. |
| 2010/0168367 | A1 | 7/2010 | Schubert et al. |
| 2013/0041115 | A1 | 2/2013 | Knott et al. |

OTHER PUBLICATIONS

U.S. Appl. No. 13/771,973, filed Feb. 20, 2013, US 2013/0217930 A1, Rene Haensel, et al.
U.S. Appl. No. 14/313,209, filed Jun. 24, 2014, US 2015/0004112 A1, Helmut Ritter, et al.
U.S. Appl. No. 14/548,724, filed Nov. 20, 2014, US 2015/0080593 A1, Frauke Henning, et al.
U.S. Appl. No. 14/896,781, filed Dec. 8, 2015, US 2016/0130402 A1, Frank Schubert, et al.
U.S. Appl. No. 11/633,378, filed Dec. 4, 2006, US 2007/0128143 A1, Burghard Gruning, et al.
U.S. Appl. No. 14/313,288, filed Jun. 24, 2014, US 2015/0004113 A1, Helmut Ritter, et al.
U.S. Appl. No. 14/906,365, filed Jan. 20, 2016, US 2016/0160081 A1, Thomas Klotzbach, et al.
U.S. Appl. No. 12/277,852, filed Nov. 25, 2008, US 2009/0137752 A1, Wilfried Knott, et al.
U.S. Appl. No. 14/355,239, filed Apr. 30, 2014, US 2014/0309446 A1, Sadik Amajjahe, et al.
U.S. Appl. No. 14/282,608, filed May 20, 2014, US 2014/0256844 A1, Frauke Henning, et al.
U.S. Appl. No. 14/813,893, filed Jul. 30, 2015, US 2015/0329752 A1, Evelyn Albrecht, et al.
U.S. Appl. No. 14/939,687, filed Nov. 12, 2015, US 2016/0130290 A1, Wilfried Knott, et al.
U.S. Appl. No. 13/521,351, filed Jul. 10, 2012, US 2012/0282210 A1, Frauke Henning, et al.
U.S. Appl. No. 13/771,921, filed Feb. 20, 2013, US 2013/0213267 A1, Michael Fiedel, et al.
U.S. Appl. No. 14/784,678, filed Oct. 15, 2015, US 2016/0053145 A1, Matthias Lobert, et al.
U.S. Appl. No. 10/083,763, filed Feb. 25, 2002, US 2002/0161158 A1, Georg Burkhart, et al.
U.S. Appl. No. 12/571,493, filed Oct. 1, 2009, US 2010/0022435 A1, Frauke Henning, et al.
U.S. Appl. No. 13/195,049, filed Aug. 1, 2011, US 2012/0028022 A1, Bastian Matthias Brugger, et al.
U.S. Appl. No. 13/888,800, filed May 7, 2013, US 2013/0245304 A1, Frank Schubert, et al.
U.S. Appl. No. 12/414,805, filed Mar. 31, 2009, US 2010/0081781 A1, Frank Schubert, et al.
U.S. Appl. No. 13/205,834, filed Aug. 9, 2011, US 2012/0037036 A1, Thomas Veit, et al.
U.S. Appl. No. 13/358,142, filed Jan. 25, 2012, US 2012/0190760 A1, Frauke Henning, et al.
U.S. Appl. No. 13/650,221, filed Oct. 12, 2012, US 2013/0041115 A1, Wilfried Knott, et al.
U.S. Appl. No. 14/888,872, filed Nov. 3, 2015, US 2016/0053051 A1, Frank Schubert, et al.
U.S. Appl. No. 13/153,622, filed Jun. 6, 2011, US 2011/0301254 A1, Wilfried Knott, et al.
U.S. Appl. No. 13/322,477, filed Nov. 25, 2011, US 2012/0068110 A1, Frank Schubert, et al.
U.S. Appl. No. 13/923,896, filed Jun. 21, 2013, US 2013/0345318 A1, Frank Schubert, et al.
U.S. Appl. No. 14/331,831, filed Jul. 15, 2014, US 2015/0023900 A1, Wilfried Knott, et al.

* cited by examiner

ETHOXYLATE PRODUCTION USING HIGHLY ACTIVE DOUBLE METAL CYANIDE CATALYSTS

SUBJECT-MATTER OF THE INVENTION

The invention relates to polyethers preparable in the presence of a DMC catalyst comprising polyether siloxanes, to processes for preparing the polyethers and to the use thereof.

PRIOR ART

The literature discloses numerous processes for preparing polyethers, both in the form of pure polyethers and with further comonomers. Alongside basic catalysis, DMC catalysis in particular has also become established for use in alkoxylation. Advantages of DMC catalysis include the ability to dispense with workup steps and special properties in the products, for example low polydispersity.

The production and use of double metal cyanide complexes as alkoxylation catalysts has been known since the 1960s and is outlined in U.S. Pat. No. 3,427,256, U.S. Pat. No. 3,427,334, U.S. Pat. No. 3,427,335, U.S. Pat. No. 3,278,457, U.S. Pat. No. 3,278,458 and U.S. Pat. No. 3,278,459 for example. Among the ever more effective types of DMC catalysts developed further in the subsequent years and described in U.S. Pat. No. 5,470,813 and U.S. Pat. No. 5,482,908, for example, a special position is occupied by zinc-cobalt-hexacyano complexes. Because of their good activity, only low catalyst concentrations are required for preparation of polyethers.

Polyethers which are prepared proceeding from an OH-functional starter are widely used. The polyethers obtained therefrom in turn have terminal OH groups. For example, when butanol, hexanediol or glycerol is used, polyethers having one, having two or having three chain-terminal hydroxyl groups are formed. The OH functionality of the polyether, which thus inevitably results from the number of OH groups in the starter, is an important property feature which determines the use options for each polyether. Polyethers which are to be crosslinked with isocyanates in the polyurethane synthesis typically have two, three or more terminal OH functions. The OH functionality determines the crosslinking density and hence, to a crucial degree, the material properties in the crosslinked final material. Primary terminal OH groups are particularly active, and these arise, for example, when the monomer which is polymerized onto the polymer in a terminal position is an ethylene oxide. One of the challenges for DMC catalysis is that the conventional DMC catalysts are sensitive to small starter alcohols or else small epoxides, for example ethylene oxide. Such substances can act as a kind of catalyst poison, as a result of which the activity of the catalyst is distinctly lowered or the catalyst is by no means rarely entirely deactivated.

Numerous modifications of DMC catalysts have been the subject of research in recent years. These always involved using surface-active substances in the preparation of the catalysts. WO 2004/000913 A1, WO 2000/74843 A1 and WO 2000/74845 A1 disclose, for example, processes for preparing multimetal cyanide compounds using fatty alcohol alkoxylates or block polyethers consisting of polyoxyethylene and polyoxypropylene blocks, obtainable under the Plurafac® or Pluronic® brand names (products from BASF SE), and to the use thereof for preparation of polyether polyols. What is noticeable that the specific examples for preparation of polyethers with the DMC catalysts described show exclusively starting of the reaction with propylene oxide.

EP1256596 A1 discloses processes for preparing DMC catalysts containing at least one surface-active substance. Equally, WO 00/47650 A1 and EP1165658 A1 are concerned with DMC catalysts containing at least one surface-active substance. In these cases too, exclusively the reaction of propylene oxide is shown with the DMC catalysts obtained.

As is well known, DMC catalysts are used, among other reactions, for alkoxylation of epoxides in particular. This always involves the known epoxides ethylene oxide, propylene oxide and butylene oxide and others. While the starting of the reaction, as is commonly known, can be performed without any problem with propylene oxide and other epoxides of higher molar masses, there are, however, only few experimental examples in which a DMC-catalysed alkoxylation is started with pure ethylene oxide, or pure ethylene oxide-based polyethers are prepared by means of DMC catalysis. The examples in the above-described documents also show the starting of the DMC catalyst with propylene oxide. This is because ethylene oxide acts as a catalyst poison in the majority of the DMC catalysts known from the literature, meaning that it blocks the catalyst, and hence the activity of the catalyst drops severely or stops entirely. It is therefore common practice first to start the catalysts with an epoxide of good compatibility, for example propylene oxide, and to add ethylene oxide only later in the reaction.

Some modified DMC catalysts which at least partly maintain their activity even when started with ethylene oxide have now also become known to those skilled in the art. However, the alkoxylation products prepared with these modified DMC catalysts, especially polyethers, have frequently poor physical properties. In the course of storage of ethylene oxide-rich polyethers which have been prepared by means of DMC catalysis, there are frequently phase separations in the product because of different EO contents in the polyether chains. This inhomogeneity of the ethoxylates results in only limited usability of the products.

There is therefore still a need for alkoxylation products which, in the case of a high proportion of comparatively small reactants, for example ethylene oxide, are homogeneous and do not have any phase separation even after several weeks of storage time. But at the same time have the positive properties of the DMC-catalysed alkoxylation products, for example low polydispersity.

The problem addressed by the present invention was that of providing alkoxylation products which have a high proportion of comparatively small reactants, for example ethylene oxide, and at the same time are homogeneous and do not have any phase separation even after several weeks of storage time, but under the condition that the positive properties of the DMC-catalysed alkoxylation products, for example low polydispersity, are maintained. A further problem addressed by the invention was that of distinctly broadening the spectrum of alkoxylation products preparable via DMC catalysis.

DETAILED DESCRIPTION

The aforementioned problem has surprisingly been solved by using DMC catalysts comprising polyether siloxanes as catalysts in the alkoxylation.

The alkoxylation products of the invention, the process for preparing them, and their use are described below by way of example, without any intention that the invention should be confined to these exemplary embodiments. Where reference is made in what follows to ranges, general formulae or classes of compounds, these shall encompass not just the corresponding ranges or groups of compounds explicitly mentioned, but also all sub-ranges and sub-groups of compounds which are obtainable by extraction of individual values (ranges) or compounds. Where documents are cited in the context of the present description, the content thereof shall fully form part of the disclosure content of the present invention particularly in respect of the substantive matter in the context for which the document was cited. Percentages referred to hereinbelow are by weight unless otherwise stated. Averages referred to hereinbelow are number averages, unless otherwise stated. Where properties of a material are referred to hereinbelow, for example viscosities or the like, these are the properties of the material measured at 25° C., unless stated otherwise.

The present invention therefore provides alkoxylation products obtainable by converting at least one epoxide (A) in the presence of at least one DMC catalyst (B) comprising
  a) one or more double metal cyanide compounds and
  b) one or more polyether siloxanes and
  c) optionally one or more organic complex ligands other than b), preference being given to the presence of at least one polyether siloxane of component b) during the preparation of the double metal cyanide compounds of component a).

The present invention further provides a process for preparing alkoxylation products by converting at least one epoxide (A) in the presence of at least one DMC catalyst (B) comprising
  a) one or more double metal cyanide compounds and
  b) one or more polyether siloxanes and
  c) optionally one or more organic complex ligands other than b), preference being given to the presence of at least one polyether siloxane of component b) during the preparation of the double metal cyanide compounds of component a).

Inventive catalysts (B) preferably correspond to the embodiments described below. Component a) comprises double metal cyanide compounds which are reaction products of water-soluble metal salts of component a1) and water-soluble metal cyanide salts of component a2).

Water-soluble metal salts of component a1) which are suitable for preparation of the double metal cyanide compounds preferably have the general formula (I)

where M is selected from the metals Zn(II), Fe(II), Ni(II), Mn(II), Co(II), Sn(II), Pb(II), Fe(III), Mo(IV), Mo(VI), Al(III), V(V), V(IV), Sr(II), W(IV), W(VI), Cu(II) and Cr(III). Particular preference is given to Zn(II), Fe(II), Co(II) and Ni(II). X is identical or different, preferably identical, anions, preferably selected from the group of the halides, hydroxides, sulphates, carbonates, cyanates, thiocyanates, isocyanates, isothiocyanates, carboxylates, oxalates and nitrates. The value of n is 1, 2 or 3. Examples of suitable water-soluble metal salts are zinc chloride, zinc bromide, zinc acetate, zinc acetylacetonate, zinc benzoate, zinc nitrate, iron(II) sulphate, iron(II) bromide, iron(II) chloride, cobalt(II) chloride, cobalt(II) thiocyanate, nickel (II) chloride and nickel(II) nitrate. It is also possible to use mixtures of different water-soluble metal salts.

Water-soluble metal cyanide salts of component a2) which are suitable for preparation of the double metal cyanide compounds preferably have the general formula (II)

where M' is selected from the metals Fe(II), Fe(III), Co(II), Co(III), Cr(II), Cr(III), Mn(II), Mn(III), Ir(II), Ni(II), Rh(III), Ru(II), V(IV) and V(V). More preferably, M' is selected from the metals Co(II), Co(III), Fe(II), Fe(III), Cr(III), Ir(III) and Ni(II). The water-soluble metal cyanide salt may contain one or more of these metals. Y is identical or different, preferably identical, alkali metal cations or alkaline earth metal cations. A is identical or different, preferably identical, anions selected from the group of the halides, hydroxides, sulphates, carbonates, cyanates, thiocyanates, isocyanates, isothiocyanates, carboxylates, oxalates and nitrates. Both a and b and c are integers, where the values of a, b and c are chosen so as to give electronic neutrality of the metal cyanide salt; a is preferably 1, 2, 3 or 4; b is preferably 4, 5 or 6; c preferably has the value of 0.

Examples of suitable water-soluble metal cyanide salts are potassium hexacyanocobaltate(III), potassium hexacyanoferrate(II), potassium hexacyanoferrate(III), calcium hexacyanocobaltate(III) and lithium hexacyanocobaltate (III). Preferred double metal cyanide compounds of component a) are compounds of the general formula (III)

in which M is as defined in formula (I) and M' as in formula (II), and x, x', y and z are integers and are chosen so as to give electronic neutrality of the double metal cyanide compound. Preferably, x is 3, x' is 1, y is 6 and z is 2, M is Zn(II), Fe(II), Co(II) or Ni(II) and M' is Co(III), Fe(III), Cr(III) or Ir(III).

Examples of suitable double metal cyanide compounds of component a) are zinc hexacyanocobaltate(III), zinc hexacyanoiridate(III), zinc hexacyanoferrate(III) and cobalt (II) hexacyanocobaltate(III). Further examples of suitable double metal cyanide compounds can be found, for example, in U.S. Pat. No. 5,158,922. Particular preference is given to using zinc hexacyanocobaltate(III).

The polyether siloxane of component b) used may in principle be any polyether siloxane. Polyether siloxanes in the context of this invention are all compounds which contain both a siloxane component and a polyether component. As has been found, the inventive alkoxylation products which have been prepared using DMC catalysts (B) containing a polyether siloxane of component b) are homogeneous and exceptionally storage-stable, even when they are pure ethylene oxide polyethers or polyethers which have been started with pure ethylene oxide. It has been found that stable alkoxylation products are produced especially by those inventive DMC catalysts (B) in which the calculated mean molar mass of the polyether siloxane is from 300 to 50 000 g/mol, preferably from 500 to 30 000 g/mol, more preferably from 600 to 10 000 g/mol, and/or, preferably and, the polyether siloxane has a weight ratio of siloxane component to polyether component of 1:1 to 1:10, preferably 1:1.2 to 1:8, more preferably from 1:1.5 to 1:5, and especially preferably from 1:1.8 to 1:3, based on the calculated mean molar mass of the polyether siloxane. In other words, the quotient which is formed from the calculated mean molar mass of the siloxane component divided by the calculated mean molar mass of the polyether component is from 0.1 to 1, preferably from 0.2 to 0.9, more preferably from 0.4 to 0.6.

The calculated mean molar mass in the context of this invention is determined as follows: Both a $^{29}$Si NMR and a $^{1}$H NMR of the polyether siloxane used are measured. The $^{29}$Si NMR gives the proportions of M, D, T and Q units. The $^{29}$Si NMR likewise shows whether and how many M and D units of the siloxane are substituted by polyether or other groups. The data thus obtained are used to calculate the molar mass of the siloxane component. Analogously, the $^1$H NMR is used to determine the proportions of the different alkylene oxides in the polyether component and the proportions of the starters. The data thus obtained are used to calculate the molar mass of the polyether component. The two contents give the calculated mean molar mass of the polyether siloxane. $^{29}$Si NMR and $^1$H NMR are measured in CDCl$_3$ as solvent. Alternatively, especially if individual polyether siloxanes should be too complex to calculate their mean molar mass by the above-described method, it is also possible prior to the preparation of the polyether siloxane to determine the polyether by $^1$H NMR prior to the reaction with the siloxane and to calculate its mean molar mass, and to determine the siloxane by $^{29}$Si NMR prior to the reaction with the polyether and to calculate its mean molar mass. The calculated mean molar masses of the two polyether and siloxane starting materials can be used by the person skilled in the art to calculate the mean molar mass of the polyether siloxane product.

To calculate the weight ratio, all polyether radicals up to the binding site to the Si atom ($R^2$ in formula IV) are counted fully as part of the polyether component, and the siloxane skeleton with all the further substituents is counted as part of the siloxane component. Polyether siloxanes having the described weight ratios between polyether component and siloxane component lead to very particularly outstanding DMC catalysts (B) which lead to particularly homogeneous and storage-stable alkoxylation products compared to the modified DMC catalysts known in the prior art or to those modified with components b) other than those defined here. It may be particularly advantageous if, as well as the polyether siloxane, a proportion, preferably greater than 0 to 2 molar equivalents, based on the polyether siloxane, of pure polyether is present, corresponding in terms of structure essentially to the polyether component of the polyether siloxane.

Particular preference is given to polyether siloxanes of component b) which comprise polydialkylsiloxanes, especially polydimethylsiloxanes, which have 1 to 100 and preferably 1 to 60 D siloxane units and in which the alkyl group, especially the methyl group, at one position has been exchanged for a polyether having 2 to 50 and preferably 3 to 20 alkylene oxide units, preferably ethylene oxide units. In addition, it is preferable when the polyether bears an OH group at the free end (i.e. not the end at which it is bonded to the siloxane).

Preferred polyether siloxanes of component b) correspond to the formula (IV)

  (formula IV)

where
M=($R^1_3$ Si O$_{1/2}$)
M'=($R^2R^1_2$ Si O$_{1/2}$)
D=($R'_2$ Si O$_{2/2}$)
D'=($R^2R^1$ Si O$_{2/2}$)
D"=($R^4R^1$ Si O$_{2/2}$)
T=($R^3$ Si O$_{3/2}$)
Q=(Si O$_{4/2}$)
d=0 to 20; preferably 1 to 10, more preferably 1 to 5 and especially preferably 2;
d1=0 to 20; preferably 1 to 10, more preferably 0 to 2; especially preferably 0;
where the sum total of d and d1 is preferably 2;
e=0 to 300; preferably 1 to 100, more preferably 2 to 40, especially preferably 0 to 20;
e1=0 to 25; preferably 0.1 to 15, more preferably 1 to 10, especially preferably 1 to 5;
e2=0 to 10; preferably 1 to 5, especially preferably 0;
f=0 to 10; preferably 1 to 5, especially preferably 0;
g=0 to 10; preferably 1 to 5, especially preferably 0;
with the proviso that
the sum total of d1 and e1 is greater than 0, preferably greater than or equal to 1,
$R^1$ is independently hydrogen or identical or different linear or branched hydrocarbyl radicals having 1 to 30 carbon atoms or else aromatic hydrocarbyl radicals having 6 to 30 carbon atoms, preferably methyl or phenyl, especially methyl;
$R^2$ is independently identical or different polyethers, where the polyethers may have side chains which may optionally also be substituted by further heteroatoms, $R^2$ preferably being selected from the group consisting of

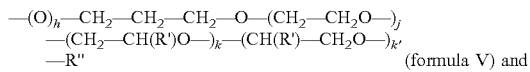  (formula V) and

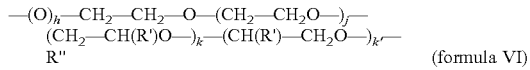  (formula VI)

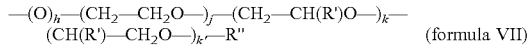  (formula VII)

where
h is 0 or 1, preferably 0,
j is 0 to 100, preferably greater than 0 to 50, more preferably 2 to 20, especially 3 to 10,
k+k'=0 to 100, preferably greater than 0 to 50, especially 2 to 20, especially 0,
with the proviso that the sum total of j, k and k' is at least 3 and the units having the indices j, k and k' are arranged in any sequence with respect to one another, i.e. in blockwise or random distribution, in the $R^2$ radical,
R' is independently an optionally substituted (substituted, for example, by alkyl radicals, aryl radicals or haloalkyl or haloalkylaryl radicals) alkyl or aryl group having 1 to 12 carbon atoms, preferably ethyl or methyl, especially methyl, and
R" is independently a hydrogen radical or an alkyl or alkylene group having 1 to 4 carbon atoms, a —C(O)—R''' group with R'''=alkyl radical, a —CH$_2$C(O)—CH$_2$C(O)—R' group, an alkylaryl group, for example a benzyl group, the —C(O)NH—R' group, R" preferably being a hydrogen radical,
$R^3$ is independently identical or different $R^1$ or $R^2$ radicals, preferably $R^1$, more preferably methyl or phenyl, especially methyl;
$R^4$ is independently identical or different organic radicals having more than 3 carbon atoms, preferably having 4 to 30 and more preferably having 4 to 20 carbon atoms, with the proviso that $R^4$ is different from $R^2$, $R^4$ preferably being selected from —CH$_2$(CH$_2$)$_n$CH$_2$—O—CH$_2$(CHOCH$_2$), where (CHOCH$_2$) is an epoxide ring, —CH$_2$(CH$_2$)$_n$C(O)O—CH$_3$, —CH$_2$(CH$_2$)$_n$CH$_2$OH, —CH$_2$(CH$_2$)$_n$CH$_2$—O—CH$_2$CH(OH)CH$_2$CH$_2$(OH) with n=0 to 20, preferably 1 to 10.

The polyethers may be bonded to the siloxane skeleton either via an Si—O—C or via an Si—C bond. Preferably, in the context of this invention, the Si—C compound is obtained, for example, as the product of the hydrosilylation. In formula (IV), the $R^2$ radical with h=1 is an Si—O—C bond and the preferred h=0 an Si—C bond. Of very particularly outstanding suitability in accordance with the invention are polyether siloxanes of component b) according to formula (IV) with d=2, d1=0, e=0 to 40, e1=1 to 5, e2, f and g=0, $R^1$=methyl, $R^2$=(formula V), (formula VI) and/or (formula VII) with h=0, j=3 to 20, k=0 to 20, preferably 0, R'=methyl or ethyl and R"=hydrogen.

According to the invention, it is possible to use all polyether siloxanes obtainable. DMC catalysts (B) which, according to present invention, contain polyether siloxanes of component b), when used as catalyst, for example in alkoxylations of epoxides, have astonishingly short induction periods and exhibit very good reactivities. Moreover, the catalyst activity thereof is not adversely affected in the case of conversion of high proportions of ethylene oxide or of pure ethylene oxide, especially even right at the start of the reaction. The examples show advances that are astonishing here in the catalyst according to the invention, for example compared to DMC catalysts known from the prior art which have been modified with other surface-active substances, for example with reaction products of fatty alcohols with alkylene oxides. The inventive catalysts (B) thus firstly lead to alkoxylation products having considerable advantages in relation to stability and homogeneity, and the reaction secondly proceeds much more quickly and effectively.

Organic complex ligands of component c) which may be present in the inventive catalysts (B) are water-soluble organic compounds having heteroatoms, such as oxygen, nitrogen, phosphorus or sulphur, which can form complexes with the double metal cyanide compound. Suitable organic complex ligands are, for example, alcohols, aldehydes, ketones, ethers, esters, amides, ureas, nitriles, sulphides and mixtures thereof. Preferred organic complex ligands are water-soluble aliphatic alcohols such as ethanol, isopropanol, n-butanol, isobutanol, sec-butanol and tert-butanol. Particular preference is given to tert-butanol.

If desired, the inventive catalysts (B) may include, as a further component d), further complex-forming components other than b) and c). Preferably, the complex-forming component d) is a component selected from polyethers, polyesters, polycarbonate, glycidyl ethers, glycoside, carboxylic esters of polyhydric alcohols, polyalkylene glycol sorbitan esters, gallic acid, salts of gallic acid, esters of gallic acid, amide of gallic acid, cyclodextrins, organic phosphate, phosphite, phosphonate, phosphonite, phosphinate or phosphinite, an ionic surface- or interface-active compound and an α,β-unsaturated carboxylic ester. Particular preference is given to polyethers, especially preferably polyethylene glycols or polypropylene glycols, polyethylene glycol and polypropylene glycol ethers, poly(oxyethylene)-co-poly(oxypropylene), poly(oxyethylene)-co-poly(oxypropylene) ethers.

A preferred embodiment of the present invention is therefore processes for preparing alkoxylation products and alkoxylation products obtainable by converting at least one epoxide (A) in the presence of at least one DMC catalyst (B) comprising
  a) one or more double metal cyanide compounds and
  b) one or more polyether siloxanes and
  c) one or more organic complex ligands other than b),
  d) one or more complex-forming components other than b) and c), preferably polyethers,
  preference being given to the presence of at least one polyether siloxane of component b) during the preparation of the double metal cyanide compounds of component a).

In a further-preferred embodiment of the present invention, the DMC catalysts (B) used for alkoxylation comprise
  a) one or more double metal cyanide compounds selected from zinc hexacyanocobaltate(III), zinc hexacyanoiridate(III), zinc hexacyanoferrate(III) and cobalt(II) hexacyanocobaltate(III),
  b) one or more polyether siloxanes,
  c) one or more organic complex ligands other than b), selected from aliphatic alcohols,
  d) optionally one or more complex-forming components other than b) and c), selected from polyethers, polyesters, polycarbonate, glycidyl ethers, glycoside, carboxylic esters of polyhydric alcohols, polyalkylene glycol sorbitan esters, gallic acid, salts of gallic acid, esters of gallic acid, amide of gallic acid, cyclodextrins, organic phosphate, phosphite, phosphonate, phosphonite, phosphinate or phosphinite, an ionic surface- or interface-active compound and an α,β-unsaturated carboxylic ester,
  preference being given to the presence of at least one polyether siloxane of component b) during the preparation of the double metal cyanide compounds of component a).

In a very particularly preferred embodiment of the present invention, the DMC catalysts (B) comprise
  a) a double metal cyanide compound selected from zinc hexacyanocobaltate(III), zinc hexacyanoferrate(III) and cobalt(II) hexacyanocobaltate(III) and
  b) one or more polyether siloxanes, preferably of the formula (IV) in which, preferably, the calculated mean molar mass of the polyether siloxane is from 500 to 30 000 g/mol, and the polyether siloxane has a weight ratio of siloxane component to polyether component of 1:1 to 1:10, preferably 1:1.2 to 1:8, more preferably from 1:1.5 to 1:5 and especially preferably from 1:1.8 to 1:3, based on the calculated mean molar mass of the polyether siloxane, more preferably with d=2, d1=0, e=0 to 40, e1=1 to 5, e2, f and g=0, $R^1$=methyl, $R^2$=(formula V), (formula VI) and/or (formula VII) with h=0, j=3 to 20, k=0 to 20, preferably 0, R'=methyl or ethyl and R"=hydrogen;
  c) one or more aliphatic alcohols, preferably tert-butanol, and
  d) optionally one or more polyethers, preferably polyethylene glycols or polypropylene glycols,
  preference being given to the presence of at least one polyether siloxane of component b) during the preparation of the double metal cyanide compounds of component a).

Most preferably, all the aforementioned embodiments of the catalyst (B) are obtainable by reaction of water-soluble metal salts with water-soluble metal cyanide salts to give double metal cyanide compounds of component a), the reaction being effected in the presence of at least one polyether siloxane of component b). Preferably, the catalysts (B) are obtainable by reacting water-soluble metal salts of component a1), especially of the formula (I), with water-soluble metal cyanide salts of component a2), especially of the formula (II), in the presence of at least one polyether siloxane of component b), especially of the formula (IV). It has been found that, surprisingly, the presence of at least one polyether siloxane of component b) during the preparation of the double metal cyanide compounds of component a) is crucial to the excellent properties of the catalyst. It has been shown in extensive studies that subsequent addition of polyether siloxanes to DMC catalysts described in the prior art, or to DMC catalysts available on the market, cannot achieve the results achieved by the DMC catalysts according to the invention.

Inventive epoxides (A) preferably correspond to the embodiments described below. The epoxide (A) used may in principle be any epoxide. Preferably, the epoxides (A) correspond to one or more epoxides selected from the alkylene oxides, glycidyl ethers and epoxy-substituted alkoxysilanes. More preferably, the epoxides (A) correspond to one or more epoxides selected from ethylene oxide, propylene oxide, 1,2- or 2,3-butylene oxide, isobutylene oxide, 1,2-dodecene oxide, styrene oxide, cyclohexene oxide, vinylcyclohexene oxide, allyl glycidyl ether, butyl glycidyl ether, 2-ethylhexyl glycidyl ether, cyclohexyl glycidyl ether, benzyl glycidyl ether, C12/C14 fatty alcohol glycidyl ether, phenyl glycidyl ether, p-tert-butylphenyl glycidyl ether, o-cresyl glycidyl ether, glycidyl methacrylate, glycidyl acrylate, glycidyl neodecanoate, 1,2-ethyl glycidyl ether, 1,4-butyl glycidyl ether, 1,6-hexyl diglycidyl ether, 3-glycidyloxypropyltrimethoxysilane, 3-glycidyloxypropyl-triethoxysilane, 3-glycidyloxypropyltripropoxysilane, 3-glycidyloxypropyltriisopropoxysilane, bis(3-glycidyloxy-propyl)dimethoxysilane, bis(3-glycidyloxypropyl)diethoxysilane, 3-glycidyloxyhexyltrimethoxysilane, 3-glycidyloxyhexyltriethoxysilane, 3-glycidyloxypropylmethyldimethoxysilane and/or 3-glycidyloxypropylethyldiethoxysilane. More preferably, the at least one epoxide (A) is ethylene oxide. More preferably, in the process according to the invention, and in order to obtain the inventive products, at least 20 mol % of ethylene oxide, preferably at least 30 mol %, more preferably at least 40 mol %, especially preferably at least 50 mol % and most preferably at least 60 mol % of ethylene oxide, based on the total molar amount of epoxide (A), is used as epoxide (A). In the case of the alkoxylation products having high proportions of ethylene oxide, the advantages of homogeneity and exceptionally high storage stability are manifested to a quite exceptional degree.

Most preferably, in the process according to the invention by which the inventive alkoxylation products are obtained, in a first step, DMC catalyst (B) is reacted with ethylene oxide, preferably in the presence of starter (C) (definition of the starters (C) to follow), and, in a second step and optionally further steps, ethylene oxide and/or further epoxides (A) other than ethylene oxide are added. It is more preferable if, in a last reaction step, after all the epoxides (A) present in the reaction mixture have been very substantially converted in the reaction (the person skilled in the art can generally estimate the progress of the reaction by monitoring the pressure), pure ethylene oxide is added once again as the sole epoxide (A). The alkoxylation products thus obtained have at least one ethylene oxide unit at each chain end. These ethylene oxide units each still have a free primary OH group which is distinguished in a positive manner by a particularly high reactivity.

In processes according to the invention for preparing alkoxylation products and alkoxylation products obtainable by this process, OH-functionalized starters (C) are preferably used in addition to epoxides (A) and DMC catalysts (B). Starters (C) used may in principle be any compound which bears at least one OH group and does not poison, i.e. deactivate, the DMC catalyst. In principle, it is possible, for example, to use any aliphatic alcohol having at least 3 carbon atoms for this purpose, and likewise aromatic alcohols, where the aforementioned compounds may be provided with further functional groups, provided that they do not adversely affect the catalyst activity, or else any kind of polyether of any length, and also polymers based on other monomers which bear at least one OH function. Preferred starters (C) are selected from the group of the alcohols having at least 3 carbon atoms, the polyetherols and the phenols. Particularly preferred starters (C) are selected from the group of allyl alcohol, butanol, octanol, dodecanol, stearyl alcohol, 2-ethylhexanol, cyclohexanol, benzyl alcohol, ethylene glycol, propylene glycol, di-, tri- and polyethylene glycol, 1,2-propylene glycol, di- and polypropylene glycol, butane-1,4-diol, hexane-1,6-diol, trimethylolpropane, glycerol, pentaerythritol, sorbitol, compounds derived from hydroxyl-bearing compounds based on natural products, or polyetherols having a molar mass of 200 to 5000 g/mol. The starters (C) preferably have a molar mass of 32 to 5000 g/mol, especially 58 to 4983 g/mol. It may be advantageous when the starters (C) have from 0 to 7 and preferably from 1 to 3 hydroxyl groups.

Preferably, low molecular weight polyetherols having 1 to 8 hydroxyl groups and weight-average molar masses of 100 to 5000 g/mol, which have themselves preferably been prepared beforehand by DMC-catalysed alkoxylation or by alkaline catalysis, are used as starter compounds. Particularly suitable are polypropylene glycols, polyethylene glycols, poly(ethylene-co-propylene) glycols, polybutylene glycols, poly(propylene-co-butylene) glycols and poly(butylene-co-ethylene) glycols, each having at least one OH group. Of these polyalkylene glycols, advantageous compounds are especially those which derive from methanol, butanol, allyl alcohol, octanol, decanol, dodecanol, butanediol, hexanediol and glycerol.

In processes according to the invention for preparing alkoxylation products and alkoxylation products obtainable by this process, it is additionally possible to use further monomers (D) in addition to epoxides (A), DMC catalysts (B) and any OH-functionalized starters (C). Further monomers (D) used may in principle be any monomers suitable for alkoxylation with epoxides (A). Examples of such compounds are dicarboxylic acids, carbon dioxide, cyclic anhydrides, lactones, for example ε-caprolactone, δ-valerolactone.

The molar mass Mw of the inventive alkoxylation products is variable over wide ranges. Preferably, the molar mass Mw of the inventive alkoxylation products is from 200 to 50 000 g/mol, preferably from 400 to 25 000 g/mol and more preferably from 600 to 15 000 g/mol.

Preferred alkoxylation products have at least 30 to 100 mol %, preferably 40 to 90 mol %, of ethylene oxide, based on the total amount of alkylene oxides used, i.e. based on the total molar amount of the epoxides (A). It is a feature of the alkoxylation products prepared in accordance with the invention that the amount of ethylene oxide is distributed homogeneously over all the alkoxylation products and the deviation in the ethylene oxide content of each individual alkoxylation product is less than 10% by weight, especially less than 6% by weight, in relation to the weight average of ethylene oxide over all the alkoxylation products which have been prepared in a reaction. This is likewise shown in that the individual alkoxylation products, in relation to all the alkoxylation products which have been prepared in a reaction, deviate in their proportion of ethylene oxide by less than 5 mol, especially less than 3 mol, from the molar proportion of ethylene oxide averaged over all the alkoxylation products which have been prepared in a reaction. In mol %, this means that the ethylene oxide content of each individual alkoxylation product deviates by less than 30 mol %, especially less than 25 mol % and most preferably less than 20 mol % from the mean molar proportion of ethylene oxide in relation to the molar proportion of ethylene oxide averaged over all the alkoxylation products which have been prepared in a reaction. Alkoxylation products which have been prepared with DMC catalysts without polyether siloxane, in contrast, have much greater deviations of at least 50 mol % in relation to the molar proportion of ethylene oxide averaged over all the alkoxylation products which have been prepared in a reaction. The effect of this is that the alkoxylation products which have not been prepared in accordance with the invention are not storage-stable, and phase separation of the product occurs even after a short time. Alkoxylation products prepared in accordance with the invention, in contrast, are homogeneous, meaning that they are sufficiently similar in terms of the structure of the individual alkoxylation products that no phase separation occurs even on storage for several weeks.

Preferred processes according to the invention for preparing the alkoxylation products comprise the steps described hereinafter.

To start the alkoxylation reaction in the process according to the invention, the starting mixture comprising, preferably consisting of, one or more OH-functional starters (C) and the DMC catalyst (B), which optionally has been suspended beforehand in a suspension medium, is preferably charged to the reactor. Suspension media utilized may be either a polyether or inert solvents or else, advantageously, one or more starters (C), or alternatively a mixture of the components mentioned. At least one epoxide (A), preferably ethylene oxide, is metered into the initially charged starter mixture. To start the alkoxylation reaction and to activate the DMC catalyst (B), usually only a portion of the total amount of epoxide (A) to be metered in is initially added. The molar ratio of epoxide (A) to OH groups in the starter (C) in the starting phase is preferably 0.1 to 10:1, more preferably 0.2 to 5:1, especially 0.4 to 3:1. It may be advantageous if, before the epoxide is added, any reaction-inhibiting substances that may be present are removed from the reaction mixture, by means of distillation, for example.

The catalyst concentration of the catalyst (B) in the reaction mixture comprising epoxide (A) and any further compounds is preferably >0 to 2000 ppmw (ppm by mass), more preferably 30 to 500 ppmw, based on the total mass of the reaction mixture. The catalyst is preferably metered into the reactor only once. The amount of catalyst should preferably be set such that sufficient catalytic activity is provided for the process. The catalyst may be metered in as solid or in the form of a catalyst suspension.

The start of the exothermic reaction may be detected by monitoring pressure and/or temperature for example. In the case of gaseous alkylene oxides, a sudden drop in pressure in the reactor indicates that the alkylene oxide is being incorporated, that the reaction has thus started and that the end of the start phase has been reached. In the case of non-gaseous glycidyl ethers/esters or epoxy-functional alkoxysilanes, the onset of the reaction is indicated by the enthalpy change which occurs.

After the starting phase, in other words after initialization of the reaction, it is preferable to meter in either further starter (C) and further epoxide (A) at the same time, or only further epoxide (A), depending on the target molar mass. Alternatively, it is also possible to add any desired mixture of different epoxides (A). The epoxides (A) usable in accordance with the invention can also be added successively in any sequence. The reaction may be performed in an inert solvent, for example to reduce the viscosity of the reaction mixture. Suitable inert solvents include hydrocarbons, especially toluene, xylene or cyclohexane. In the products of the invention, the molar ratio of the sum of the metered epoxides, including the epoxides already added in the starting phase, based on the starting compound employed, more particularly based on the number of OH groups in the starting compound employed, is preferably 1 to $10^5$:1, more particularly 1 to $10^4$:1.

The addition of the epoxide compounds occurs preferably at a temperature of 60 to 250° C., more preferably at a temperature of 90 to 160° C. The pressure at which the alkoxylation takes place is preferably 0.02 bar to 20 bar, more preferably 0.05 to 10 bar and more particularly from 0.2 to 2 bar absolute. By carrying out the alkoxylation at sub-atmospheric pressure it is possible to implement the reaction very safely. The alkoxylation may optionally be carried out in the presence of an inert gas (e.g. nitrogen) or—for producing polyethercarbonates—in the presence of carbon dioxide in this case also at a positive pressure of from preferably 1 to 20 bar absolute.

In the process according to the invention, it is possible to use further monomers (D). The lactones or cyclic anhydrides of the monomers (D) usable for the preparation of ester-modified polyethers may either be added to the starter/catalyst mixture as early as in the start phase or introduced at a later juncture, in parallel with the metered addition of epoxide. The comonomers mentioned can also each be metered into the reactor in alternating succession with epoxides (A).

The molar ratio of the epoxide monomers (A) to cyclic anhydrides of the monomers (D) is variable. Based on anhydrides, at least equimolar amounts of epoxide monomers (A) are typically used. Preference is given to using the epoxides (A) in a molar excess in order to ensure full anhydride conversion. Lactones of the monomers (D) may be added during the alkoxylation either in stoichiometric deficiency or excess based on the epoxide monomers (A). For preparation of carbonate-modified polyethers, the alkoxylation takes place in the presence either of carbon dioxide in gaseous form or of solid carbon dioxide supplied in the form of dry ice. Preference is given to using carbon dioxide gas which can be supplied either before the start of the reaction, i.e. during the initialization stage, to the system composed of starter (C) and DMC catalyst (B), or else during the subsequent phase of the feeding of epoxide monomers and any further comonomers (D). In order to increase the carbonate content in the end product, it is advantageous, in accordance with the carbon dioxide consumption, recognizable by the pressure decrease in the autoclave, to meter in further carbon dioxide continuously or in portions in the course of the conversion. The reaction is preferably accomplished at pressures of less than 100 bar, more preferably at less than 20 bar.

After the monomer addition and any post-reaction to complete the monomer conversion of the epoxides (A) and the monomers (D), any residues of unreacted monomers (A) and (D) and any further volatile constituents are removed, typically by vacuum distillation, gas stripping or other deodorization methods. Volatile secondary components may be removed either batchwise or continuously. In the DMC catalysis-based process according to the invention, filtration may normally be eschewed.

The process steps may be performed at identical or different temperatures. The mixture of starter (C), DMC catalyst (B) and any suspension medium that is initially charged into the reactor to start the reaction may be pre-treated by stripping according to the teaching of WO 98/52689 before metered addition of epoxide monomer (A) and any further monomers (D) is commenced. This comprises admixing an inert gas with the reaction mixture via the reactor feed and removing relatively volatile components from the reaction mixture by application of negative pressure using a vacuum plant connected to the reactor system. In this simple fashion, substances which may inhibit the catalyst, such as lower alcohols or water for example, can be removed from the reaction mixture. The addition of inert gas and the simultaneous removal of the relatively volatile components may be advantageous particularly at reaction start-up, since the addition of the reactants, or secondary reactions, may also introduce inhibiting compounds into the reaction mixture.

The subject-matter of the present invention is elucidated in detail hereinafter with reference to examples, without any intention that the subject-matter of the invention be restricted to these illustrative embodiments.

EXAMPLES

Chemicals Used

Zinc chloride (≥98%) and potassium hexacyanocobaltate (III) were purchased from Sigma-Aldrich, tert-Butanol (≥99%) was purchased from Carl Roth. Double metal cyanide catalyst (ARCOL) was purchased from Bayer AG. Pluronic® 6100 block polyether was purchased from BASF. Propylene oxide and ethylene oxide were purchased from GHC Gerling, Holz & CO Handels GmbH.

GPC Measurements:

GPC measurements for determining the polydispersity and weight-average molar masses Mw were carried out under the following measurement conditions: Column combination SDV 1000/10 000 Å (length 65 cm), temperature 30° C., THF as mobile phase, flow rate 1 ml/min, sample concentration 10 g/l, RI detector, evaluation of the polyethers was carried out against polypropylene glycol standard (76-6000 g/mol).

Determination of the Ethylene Oxide Content in the Polyether:

The determination of the EO content was carried out with the help of $^1$H NMR spectroscopy. A NMR spectrometer of the Bruker Avance 400 type was used, the samples were dissolved for this in $CDCl_3$.

Determination of OH Number:

Hydroxyl numbers were determined according to the method DGF C-V 17a (53) of the Deutsche Gesellschaft für Fettwissenschaft [German Society for Fat Science]. This involved acetylating the samples with acetic anhydride in the presence of pyridine and determining the consumption of acetic anhydride by titration with 0.5 N potassium hydroxide solution in ethanol using phenolphthalein.

The centrifuge used is the 4-15 model from Sigma Laborzentrifugen GmbH.

Parameter settings:
Speed: 8000 min$^{-1}$
Centrifugation time: 20 min
RCF: 10 375

In the examples which follow, by way of example, polypropylene glycol (PPG) having a molar mass $M_{OH}$=765 g/mol, which was determined via the OH number, was used as complex-forming component d).

Example A: Preparation of the Double Metal Cyanide Catalysts

Example A1: Comparative Example without Additive

A multineck flask with a precision glass paddle stirrer, reflux condenser, inert gas inlet and temperature sensor was initially charged with 3.68 g of potassium hexacyanocobaltate(III) dissolved in 40 ml of distilled water, and the mixture was heated to 50° C. under a nitrogen atmosphere. Separately, a solution of 13.63 g of zinc chloride and 20 ml of tert-butanol in 100 ml of distilled water was prepared and added dropwise by means of a dropping funnel to the initially charged solution within about one hour. Subsequently, a further solution consisting of 3.5 g of PPG, 1 ml of distilled water and 20 ml of tert-butanol was added dropwise to the reaction mixture. After a continued stirring period of 10 minutes, the suspension formed was filtered. The filtercake was slurried in the flask in a solution of 40 ml of distilled water and 80 ml of tert-butanol, filtered again, washed with the abovementioned tert-butanol/water mixture and then dried at 70° C. in a drying cabinet overnight. The product obtained was 4.93 g of white powder which was stored over $CaCl_2$ in a desiccator.

Example A2: DMC Preparation Using a Polyether Siloxane Having Siloxane Component 36% by Weight and Polyether Component 64% by Weight A multineck flask with a precision glass paddle stirrer, reflux condenser, inert gas inlet and temperature sensor was initially charged with 3.68 g of potassium hexacyanocobaltate(III) dissolved in 40 ml of distilled water, and the mixture was heated to 50° C. under a nitrogen atmosphere. Separately, a solution of 13.63 g of zinc chloride, 20 ml of tert-butanol and 1 g of a polyether siloxane having siloxane component 36% by weight and polyether component 64% by weight in 100 ml of distilled water was prepared and added dropwise by means of a dropping funnel to the initially charged solution within about one hour. Subsequently, a further solution consisting of 3.5 g of PPG, 1 ml of distilled water, 1 g of a polyether siloxane having siloxane component 36% by weight and polyether component 64% by weight and 20 ml of tert-butanol was added dropwise to the reaction mixture. After a continued stirring period of 10 minutes, the suspension formed was filtered. The filtercake was slurried in the flask in a solution of 40 ml of distilled water and 80 ml of tert-butanol, filtered again, washed with the abovementioned tert-butanol/water mixture and then dried at 70° C. in a drying cabinet overnight. The product obtained was 5.18 g of white powder which was stored over $CaCl_2$ in a desiccator.

Example A3: Comparative Example 3 (DMC Preparation Using Pluronic 6100)

A multineck flask with a precision glass paddle stirrer, reflux condenser, inert gas inlet and temperature sensor was initially charged with 3.68 g of potassium hexacyanocobaltate(III) dissolved in 40 ml of distilled water, and the mixture was heated to 50° C. under a nitrogen atmosphere. Separately, a solution of 13.63 g of zinc chloride, 20 ml of tert-butanol and 1 g of Pluronic 6100 in 100 ml of distilled water was prepared and added dropwise by means of a dropping funnel to the initially charged solution within about one hour. Subsequently, a further solution consisting of 3.5 g of PPG, 1 ml of distilled water, 1 g of Pluronic 6100 and 20 ml of tert-butanol was added dropwise to the reaction mixture. After a continued stirring period of 10 minutes, the suspension formed was filtered. The filtercake was slurried in the flask in a solution of 40 ml of distilled water and 80 ml of tert-butanol, filtered again, washed with the abovementioned tert-butanol/water mixture and then dried at 70°

C. in a drying cabinet overnight. The product obtained was 4.8 g of white powder which was stored over $CaCl_2$ in a desiccator.

Example A4: DMC Preparation Using a Polyether Siloxane Having Siloxane Component 32% by Weight and Polyether Component 68% by Weight A multineck flask with a precision glass paddle stirrer, reflux condenser, inert gas inlet and temperature sensor was initially charged with 3.68 g of potassium hexacyanocobaltate(III) dissolved in 40 ml of distilled water, and the mixture was heated to 50° C. under a nitrogen atmosphere. Separately, a solution of 13.63 g of zinc chloride, 20 ml of tert-butanol and 1 g of a polyether siloxane having siloxane component 32% by weight and polyether component 68% by weight in 100 ml of distilled water was prepared and added dropwise by means of a dropping funnel to the initially charged solution within about one hour. Subsequently, a further solution consisting of 3.5 g of PPG, 1 ml of distilled water, 1 g of a polyether siloxane having siloxane component 32% by weight and polyether component 68% by weight and 20 ml of tert-butanol was added dropwise to the reaction mixture. After a continued stirring period of 10 minutes, the suspension formed was filtered. The filtercake was slurried in the flask in a solution of 40 ml of distilled water and 80 ml of tert-butanol, filtered again, washed with the abovementioned tert-butanol/water mixture and then dried at 70° C. in a drying cabinet overnight. The product obtained was 4.69 g of white powder which was stored over $CaCl_2$ in a desiccator.

Example A5: Comparative Example 2 (ARCOL Treated with a Polyether Siloxane Having Siloxane Component 32% by Weight and Polyether Component 68% by Weight)

A multineck flask with a precision glass stirrer, reflux condenser, inert gas inlet and temperature sensor was charged with 0.5 g of ARCOL catalyst in a solution of 0.5 ml of distilled water, 10 ml of tert-butanol and 2 g of a polyether siloxane having siloxane component 32% by weight and polyether component 68% by weight, and the mixture was stirred at RT for 60 min. The suspension formed was filtered. The filtercake was dried at 70° C. in a drying cabinet overnight. The product obtained was 0.552 g of white powder which was stored over $CaCl_2$ in a desiccator.

Example A6: DMC Preparation Using a Polyether Siloxane Having Siloxane Component 32% by Weight and Polyether Component 68% by Weight Only in PPG Solution A multineck flask equipped with a precision glass paddle stirrer, reflux condenser, inert gas inlet and temperature sensor was initially charged with 3.32 g of potassium hexacyanocobaltate(III) dissolved in 40 ml of distilled water, and the mixture was heated to 50° C. under a nitrogen atmosphere. Separately, a solution of 13.63 g of zinc chloride and 20 ml of tert-butanol in 100 ml of distilled water was prepared and added dropwise by means of a dropping funnel to the initially charged solution within about one hour. Subsequently, a further solution consisting of 3.5 g of PPG, 1 ml of distilled water and 20 ml of tert-butanol was added dropwise to the reaction mixture. After a continued stirring period of 10 minutes, the suspension formed was filtered. The filtercake was slurried in the flask in a solution of 40 ml of distilled water and 80 ml of tert-butanol, filtered again, washed with the abovementioned tert-butanol/water mixture and then dried at 70° C. in a drying cabinet overnight. The product obtained was 4.5 g of white powder which was stored over $CaCl_2$ in a desiccator.

Example A7: DMC Preparation Using a Polyether Siloxane Having Siloxane Component 32% by Weight and Polyether Component 68% by Weight Only in Wash Solution A multineck flask equipped with a precision glass paddle stirrer, reflux condenser, inert gas inlet and temperature sensor was initially charged with 3.32 g of potassium hexacyanocobaltate(III) dissolved in 40 ml of distilled water, and the mixture was heated to 50° C. under a nitrogen atmosphere. Separately, a solution of 13.63 g of zinc chloride and 20 ml of tert-butanol in 100 ml of distilled water was prepared and added dropwise by means of a dropping funnel to the initially charged solution within about one hour. Subsequently, a further solution consisting of 3.5 g of PPG, 1 ml of distilled water and 20 ml of tert-butanol was added dropwise to the reaction mixture. After a continued stirring period of 10 minutes, the suspension formed was filtered. The filtercake was slurried in the flask in a solution of 40 ml of distilled water, 1 g of a polyether siloxane having siloxane component 32% by weight and polyether component 68% by weight and 80 ml of tert-butanol, filtered again and then dried at 70° C. in a drying cabinet overnight. The product obtained was 5.07 g of white powder which was stored over $CaCl_2$ in a desiccator.

Example B: Preparation of Polyether Polyols (Ethoxylates)

In the examples which follow, the starter polyether used, by way of example, was poly(oxypropylene) monobutyl ether having molar mass $M_{OH}$=384 g/mol, which was determined via the OH number. In principle, the syntheses can be conducted with any starter which has one or more hydroxyl groups and is suitable for use in DMC-catalysed reactions.

Example B1: Catalyst from Example A1

A 5 liter autoclave was initially charged with 255 g of poly(oxypropylene) monobutyl ether as starter and 96 mg of DMC catalyst A1, and heated to 130° C. while stirring. The reactor was evacuated down to an internal pressure of 30 mbar in order to distillatively remove any volatile ingredients present. To activate the DMC catalyst, a portion of 40 g of ethylene oxide was fed in. After the reaction had started up and the internal pressure had dropped, at first a further 252 g of ethylene oxide were metered in. Since no pressure decrease in the reactor was observed, the addition of ethylene oxide was stopped and the reactor was deodorized.

Example B2: Catalyst from Example A2

A 5 liter autoclave was initially charged with 255 g of poly(oxypropylene) monobutyl ether as starter and 96 mg of DMC catalyst A2, and heated to 130° C. while stirring. The reactor was evacuated down to an internal pressure of 30 mbar in order to distillatively remove any volatile ingredients present. To activate the DMC catalyst, a portion of 40 g of ethylene oxide was introduced. After the reaction had started up and the internal pressure had dropped, at first a further 252 g of ethylene oxide were metered in while cooling. This was followed by 40 minutes of continued reaction at 130° C. with subsequent degassing. This removed volatile components such as residual ethylene oxide by distillation under reduced pressure at 130° C. The alkoxylation product was cooled to below 90° C. and discharged from the reactor. According to GPC, the product had a weight-average molar mass of 783 g/mol and a polydispersity Mw/Mn of 1.1. The OH number determined was 72.5.

Induction period: 27 min

Example B3: Catalyst from Example A3

A 5 liter autoclave was initially charged with 255 g of poly(oxypropylene) monobutyl ether as starter and 96 mg of DMC catalyst A3, and heated to 130° C. while stirring. The reactor was evacuated down to an internal pressure of 30 mbar in order to distillatively remove any volatile ingredients present. To activate the DMC catalyst, a portion of 40 g of ethylene oxide was fed in. After the reaction had started up and the internal pressure had dropped, a further 252 g of ethylene oxide were metered in while cooling, and a decrease in the reaction rate was recorded in the course of the polymerization. This was followed by 40 minutes of continued reaction at 130° C. with subsequent degassing. This removed volatile components such as residual ethylene oxide by distillation under reduced pressure at 130° C. The alkoxylation product was cooled to below 90° C. and discharged from the reactor.

According to GPC, the product had a weight-average molar mass of 929 g/mol and a polydispersity Mw/Mn of 1.11. The OH number determined was 69.0.

Induction period: 44 min

Example B4: Catalyst from Example A4

A 5 liter autoclave was initially charged with 255 g of poly(oxypropylene) monobutyl ether as starter and 96 mg of DMC catalyst A4, and heated to 130° C. while stirring. The reactor was evacuated down to an internal pressure of 30 mbar in order to distillatively remove any volatile ingredients present. To activate the DMC catalyst, a portion of 40 g of ethylene oxide was fed in. After the reaction had started up and the internal pressure had dropped, at first a further 252 g of ethylene oxide were metered in while cooling. This was followed by 40 minutes of continued reaction at 130° C. with subsequent degassing. This removed volatile components such as residual ethylene oxide by distillation under reduced pressure at 130° C. The alkoxylation product was cooled to below 90° C. and discharged from the reactor.

According to GPC, the product had a weight-average molar mass of 810 g/mol and a polydispersity Mw/Mn of 1.09. The OH number determined was 72.8.

Induction period: 24 min

Example B5: Catalyst from Example A5

A 5 liter autoclave was initially charged with 255 g of poly(oxypropylene) monobutyl ether as starter and 96 mg of DMC catalyst A5, and heated to 130° C. while stirring. The reactor was evacuated down to an internal pressure of 30 mbar in order to distillatively remove any volatile ingredients present. To activate the DMC catalyst, a portion of 40 g of ethylene oxide was fed in. After the reaction had started up and the internal pressure had dropped, a further 252 g of ethylene oxide were metered in while cooling. This was followed by 40 minutes of continued reaction at 130° C. with subsequent degassing. This removed volatile components such as residual ethylene oxide by distillation under reduced pressure at 130° C. The alkoxylation product was cooled to below 90° C. and discharged from the reactor.

According to GPC, the product had a weight-average molar mass of 895 g/mol and a polydispersity Mw/Mn of 1.08. The OH number determined was 67.1.

Induction period: 38 min

Example B6: Catalyst from Example A6

A 5 liter autoclave was initially charged with 255 g of poly(oxypropylene) monobutyl ether as starter and 96 mg of DMC catalyst A6, and heated to 130° C. while stirring. The reactor was evacuated down to an internal pressure of 30 mbar in order to distillatively remove any volatile ingredients present. To activate the DMC catalyst, a portion of 40 g of ethylene oxide was introduced. After the reaction had started up and the internal pressure had dropped, at first further ethylene oxide was metered in while cooling. After the 252 g of ethylene oxide had already been added, the internal pressure in the reactor did not fall completely to the original value, and so a residual amount of EO had to be distilled off at the end of the polymerization.

Example B8: Catalyst from Example A7

A 5 liter autoclave was initially charged with 255 g of poly(oxypropylene) monobutyl ether as starter and 96 mg of DMC catalyst A7, and heated to 130° C. while stirring. The reactor was evacuated to an internal pressure of 30 mbar in order to distillatively remove any volatile ingredients present. To activate the DMC catalyst, a portion of 40 g of ethylene oxide was introduced. Since, after 130 min, the internal temperature did not drop to the original value and did not decrease any further either, the residual amount of EO was distilled off and the polymerization reaction was stopped.

Example B7: ARCOL as Catalyst

A 5 liter autoclave was initially charged with 255 g of poly(oxypropylene) monobutyl ether as starter and 96 mg of DMC catalyst ARCOL, and heated to 130° C. while stirring. The reactor was evacuated down to an internal pressure of 30 mbar in order to distillatively remove any volatile ingredients present. To activate the DMC catalyst, a portion of 40 g of ethylene oxide was fed in. After the reaction had started up and the internal pressure had dropped, at first a further 252 g of ethylene oxide were metered in while cooling. This was followed by 40 minutes of continued reaction at 130° C. with subsequent degassing. This removed volatile components such as residual ethylene oxide by distillation under reduced pressure at 130° C. The alkoxylation product was cooled to below 90° C. and discharged from the reactor. According to GPC, the product had a weight-average molar mass of 914 g/mol and a polydispersity Mw/Mn of 1.07. The OH number determined was 69.2.

Induction period: 41 min

The catalyst A4, which was prepared using a polyether siloxane, compared to the prior art ARCOL catalyst and the catalyst A3 prepared using Pluronic 6100 block polyether, exhibits quicker start-up characteristics during the activation phase and is therefore more catalytically active.

Moreover, catalysts where the polyether siloxane was added not during the precipitation of the zinc hexacyanocobaltate complex but in a later step in the course of synthesis thereof were inactive in the ethoxylation.

The person skilled in the art is aware that, on addition of ethylene oxide, the products solidify with increasing EO content or, if the addition is inhomogeneous, separation effects occur in the product. In order to show that ethoxylates which were prepared with the ARCOL catalyst and the A4 catalyst lead to different products, the finished products were cooled to room temperature and centrifuged, and the two phases (liquid upper phase and the solid lower phase) were analysed by means of $^1$H NMR and GPC. The table which follows summarizes the analysis results.

| Polyether | Proportion of EO (mol) | Δ Proportion of EO (mol) | $M_n$ (g/mol) | Appearance of the sample |
|---|---|---|---|---|
| B2 upper phase | 9.12 | 1.99 | 798 | pale yellow, opaque |
| B2 lower phase | 11.11 | | 859 | |
| B4 upper phase | 9.77 | 1.21 | 828 | pale yellow, opaque |
| B4 lower phase | 10.98 | | 875 | |
| B5 upper phase | 10.29 | 8.46 | 798 | biphasic, white solid and clear supernatant |
| B5 lower phase | 18.75 | | 1009 | |
| B7 upper phase | 10.53 | 6.15 | 842 | biphasic, white solid and clear supernatant |
| B7 lower phase | 16.68 | | 1006 | |

The analysis of the two phases of the products separated by the centrifuging showed that the addition of ethylene oxide in the Arcol catalysis is inhomogeneous. The effect of this is that the biphasic ethoxylate consists of EO-rich (solid) content and the still-liquid residual polyether having a much lower EO content. In the case of the polyethers B2 and B4, no phase separation was observed; the minimal difference in the amount of EO in the two phases confirms the homogeneous addition of the monomer onto the chain ends.

The invention claimed is:

1. A process for preparing an alkoxylation product, the process comprising:
   converting an epoxide (A) in the presence of a double metal cyanide catalyst (B) thereby forming an alkoxylation product, wherein the epoxide (A) comprises at least 30 mol % of ethylene oxide, based on a total molar amount of the epoxide (A),
   the catalyst comprising
   a double metal cyanide compound comprising
   at least one double metal cyanide compound selected from group consisting of zinc hexacyanocobaltate(III), zinc hexacyanoiridate(III), zinc hexacyanoferrate(III), and cobalt(II) hexacyanocobaltate(III) as the double metal cyanide compound,
   a polyether siloxane,
   one or more organic complex ligands which are different than the polyether siloxane and are aliphatic alcohols, and
   optionally one or more complex-forming components which are different from the polyether siloxane and the organic complex ligands which are at least one selected from the group consisting of polyethers, polyesters, a polycarbonate, glycidyl ethers, glycoside, carboxylic esters of polyhydric alcohols, polyalkylene glycol sorbitan esters, gallic acid, salts of gallic acid, esters of gallic acid, an amide of gallic acid, cyclodextrins, organic phosphate, phosphite, phosphonate, phosphonite, phosphinate or phosphinite, an ionic surface- or interface-active compound and an a,ß-unsaturated carboxylic ester, and
   a polyether siloxane of general formula (IV)

$$M_d M'_{d1} D_e D'_{e1} D''_{e2} T_f Q_g \quad \text{(formula IV)}$$

wherein
   M is $(R^1_3 SiO_{1/2})$
   M' is $(R^2 R^1_2 SiO_{1/2})$
   D is $(R^1_2 SiO_{2/2})$
   D' is $(R^2 R^1 SiO_{2/2})$
   D" is $(R^4 R^1 SiO_{2/2})$
   T is $(R^3 SiO_{3/2})$
   Q is $(SiO_{4/2})$
   d is 0 to 20;
   d1 is 0 to 20;
   e is 0 to 300;
   e1 is 0 to 25;
   e2 is 0 to 10;
   f is 0 to 10;
   g=0 to 10;
   with the proviso that the sum of d1 and e1 is greater than 0; and
   each $R^1$ is independently a hydrogen or a linear or branched hydrocarbyl radical having 1 to 30 carbon atoms or an aromatic hydrocarbyl radical having 6 to 30 carbon atoms;
   each $R^2$ is independently a polyether, wherein the polyether optionally comprises side chains which are optionally substituted with heteroatoms,
   each $R^3$ is independently a $R^1$ or $R^2$ radicals,
   each $R^4$ is independently an organic radical having 4 to 30 carbon atoms, with the proviso that $R^4$ is different from $R^2$
   and preparing the double metal cyanide catalyst (B) by reacting soluble metal salts with water-soluble metal cyanide salts to form double metal cyanide compounds of the component a) in the presence of a polyether siloxane of component b).

2. The process according to claim 1, wherein the polyether siloxane has a weight ratio of a siloxane component to a polyether component of 1:1 to 1:10, based on a calculated mean molar mass of the polyether siloxane.

3. The process according to claim 1, wherein the polyether siloxane has a weight ratio of a siloxane component to a polyether component of 1:1.2 to 1:8, based on a calculated mean molar mass of the polyether siloxane.

4. The process according to claim 1, wherein each $R^2$ in general formula (IV) is independently a polyether of at least one formula selected from the group consisting of formula V, formula VI, and formula VII

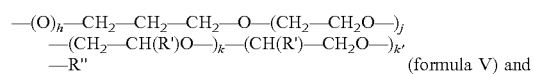

$$-(O)_h-CH_2-CH_2-CH_2-O-(CH_2-CH_2O-)_j-$$
$$-(CH_2-CH(R')O-)_k-(CH(R')-CH_2O-)_{k'}$$
$$-R'' \quad \text{(formula V) and}$$

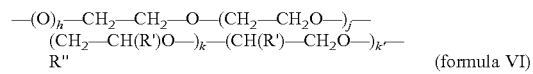

$$-(O)_h-CH_2-CH_2-O-(CH_2-CH_2O-)_j-$$
$$(CH_2-CH(R')O-)_k-(CH(R')-CH_2O-)_{k'}-$$
$$R'' \quad \text{(formula VI)}$$

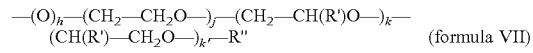

$$-(O)_h-(CH_2-CH_2O-)_j-(CH_2-CH(R')O-)_k-$$
$$(CH(R')-CH_2O-)_{k'}-R'' \quad \text{(formula VII)}$$

wherein
h is 0 or 1,
k+k' is 0 to 100, with the proviso that the sum of j, k and k' is at least 3,
each R' is independently an optionally substituted alkyl or aryl group having 1 to 12 carbon atoms, and
each R" is independently a hydrogen radical or an alkyl group having 1 to 4 carbon atoms.

5. The process according to claim 4, wherein the polyether siloxane of the double metal cyanide catalyst (B) is a polyether siloxane of general formula (IV) wherein d is 2, d1 is 0, e is 0 to 40, e1 is 1 to 5, e2 is 0, f is 0 and g is 0, each $R^1$ is methyl, each $R^2$ is a polyether of at least one formula selected from the group consisting of (formula V), (formula VI) and (formula VII) wherein h is 0, j is 3 to 20, k is 0 to 20, each R' is methyl or ethyl and each R" is hydrogen.

6. The process according to claim 5, wherein the alkoxylation product comprises 30 to 100 mol % of ethylene oxide in reacted form, based on the total molar amount of the epoxide (A).

7. The process according to claim 1, wherein the has a weight ratio of a siloxane component to a polyether component of 1:1.5 to 1:5, based on a calculated mean molar mass of the polyether siloxane.

8. The process according to claim 1, wherein the epoxide (A) and a starter (C) are converted in the presence of the double metal cyanide catalyst (B), and wherein the starter (C) is at least one selected from the group consisting of alcohols comprising at least 3 carbon atoms, polyetherols and phenols.

9. The process according to claim 8, wherein the the starter (C) comprises an OH functionality.

10. The process according to claim 8, wherein the starter (C) is at least one selected from the group consisting of allyl alcohol, butanol, octanol, dodecanol, stearyl alcohol, 2-ethylhexanol, cyclohexane, benzyl alcohol, ethylene glycol, propylene glycol, di-, tri- and polyethylene glycol, 1,2-propylene glycol, di- and polypropylene glycol, butane-1,4-diol, hexane-1,6-diol, trimethylolpropane, glycerol, pentaerythritol, sorbitol and polyetherols having a molar mass of 200 to 5000 g/mol.

11. The process according to claim 1, wherein the has a weight ratio of a siloxane component to a polyether component of 1:1.8 to 1:3, based on a calculated mean molar mass of the polyether siloxane.

12. The process according to claim 1, wherein the alkoxylation product comprises more than one alkoxylation product comprising ethylene oxide in reacted form and the ethylene oxide content in reacted form of each individual alkoxylation product deviates by less than 30 mol % from the mean molar proportion of ethylene oxide in reacted form in relation relative to the molar proportion of ethylene oxide in reacted form averaged over all the alkoxylation products formed.

13. The process according to claim 1, wherein the alkoxylation product comprises 30 to 100 mol % of ethylene oxide in reacted form, based on the total molar amount of the epoxide (A).

14. The process according to claim 13, wherein the double metal cyanide catalyst (B) has an induction period of less than 30 minutes.

15. The process according to claim 13, wherein the double metal cyanide catalyst (B) has a lower induction period than an otherwise identical process employing an otherwise identical catalyst lacking the polyether siloxane.

16. The process according to claim 1, wherein the alkoxylation product comprises more than one alkoxylation product comprising ethylene oxide in reacted form and the ethylene oxide in reacted form content of each individual alkoxylation product deviates by less than 10% by weight, relative to the weight average of ethylene oxide in reacted form over all the alkoxylation products formed.

\* \* \* \* \*